US008899928B2

United States Patent
Girard et al.

(10) Patent No.: US 8,899,928 B2
(45) Date of Patent: Dec. 2, 2014

(54) DEVICE FOR REDUCING THE VIBRATION GENERATED BY A ROTORCRAFT LIFT ROTOR, AND A ROTOR HUB PROVIDED WITH SUCH A DEVICE

(75) Inventors: Vincent Girard, Venelles (FR); Arnaud Varin D'Ainvelle, Les Milles (FR)

(73) Assignee: Airbus Helicopters, Marignane Cedex (FR)

( * ) Notice: Subject to any disclaimer, the term of this patent is extended or adjusted under 35 U.S.C. 154(b) by 799 days.

(21) Appl. No.: 13/089,419

(22) Filed: Apr. 19, 2011

(65) Prior Publication Data

US 2011/0268573 A1    Nov. 3, 2011

(30) Foreign Application Priority Data

Apr. 30, 2010 (FR) ...................... 10 01852

(51) Int. Cl.
  *F01D 5/10* (2006.01)
  *B64C 27/00* (2006.01)

(52) U.S. Cl.
  CPC ......... *B64C 27/001* (2013.01); *B64C 2027/003* (2013.01); *B64C 2027/005* (2013.01); *Y10S 416/50* (2013.01)
  USPC .......................................... 416/144; 416/500

(58) Field of Classification Search
  CPC ............. F01D 5/00; F01D 5/10; F01D 25/04; B64C 27/001; B64C 11/008
  USPC .......... 415/119; 416/79, 80, 81, 82, 144, 145, 416/500
  See application file for complete search history.

(56) References Cited

U.S. PATENT DOCUMENTS

| 4,218,187 | A | * | 8/1980 | Madden | ........................ | 416/145 |
| 4,596,513 | A | | 6/1986 | Carlson | | |
| 5,495,924 | A | * | 3/1996 | Shaw et al. | ................... | 188/378 |
| 5,639,214 | A | * | 6/1997 | Guimbal | ....................... | 416/145 |
| 6,443,273 | B1 | | 9/2002 | Ledbetter | | |
| 6,494,680 | B2 | * | 12/2002 | Cardin | .......................... | 416/145 |
| 8,517,685 | B2 | * | 8/2013 | Manfredotti | .................. | 416/145 |
| 2005/0079056 | A1 | | 4/2005 | Welsh | | |

FOREIGN PATENT DOCUMENTS

| EP | 0739814 A1 | 10/1996 |
| EP | 0790180 A1 | 8/1997 |
| FR | 2018491 A1 | 5/1970 |
| FR | 2416838 A1 | 9/1979 |

(Continued)

OTHER PUBLICATIONS

Search Report and Written Opinion; Application No. FR 1001852; dated Dec. 20, 2010.

(Continued)

*Primary Examiner* — Edward Look
*Assistant Examiner* — Christopher J Hargitt
(74) *Attorney, Agent, or Firm* — Brooks Kushman P.C.

(57) ABSTRACT

A device (10) for reducing the vibration of a rotorcraft main rotor (1) provided with a hub (2) and a plurality of blades, said device having a support (20) together with at least one weight element (30). Said weight element (30) is fastened to said support (20) by connection means (40), and said weight element (30) is connected to said connection means (40) by guide means (50) for guiding said weight element (30) in movement in circular translation in a filter plane (P1) that is movable perpendicularly to an elevation axis (AX) of said device (10), said connection means (40) including resilient return means (41) serving to allow said filter plane (P1) to move in elevation while keeping the filter plane (P1) perpendicular to said elevation axis (AX) under the effect of said vibration.

17 Claims, 2 Drawing Sheets

(56) References Cited

FOREIGN PATENT DOCUMENTS

| FR | 2435391 | A1 | 4/1980 |
|----|---------|----|--------|
| FR | 2575800 | A1 | 7/1986 |
| FR | 2733483 | A1 | 10/1996 |
| FR | 2749901 | A1 | 12/1997 |
| FR | 2768995 | A1 | 4/1999 |
| WO | 9910233 | A2 | 3/1999 |
| WO | 2005079200 | A2 | 9/2005 |

OTHER PUBLICATIONS

Korean Notice of the Decision for Rejection Dated May 23, 2013, Application No. 10-2011-0036773, Applicant Eurocopter.

* cited by examiner

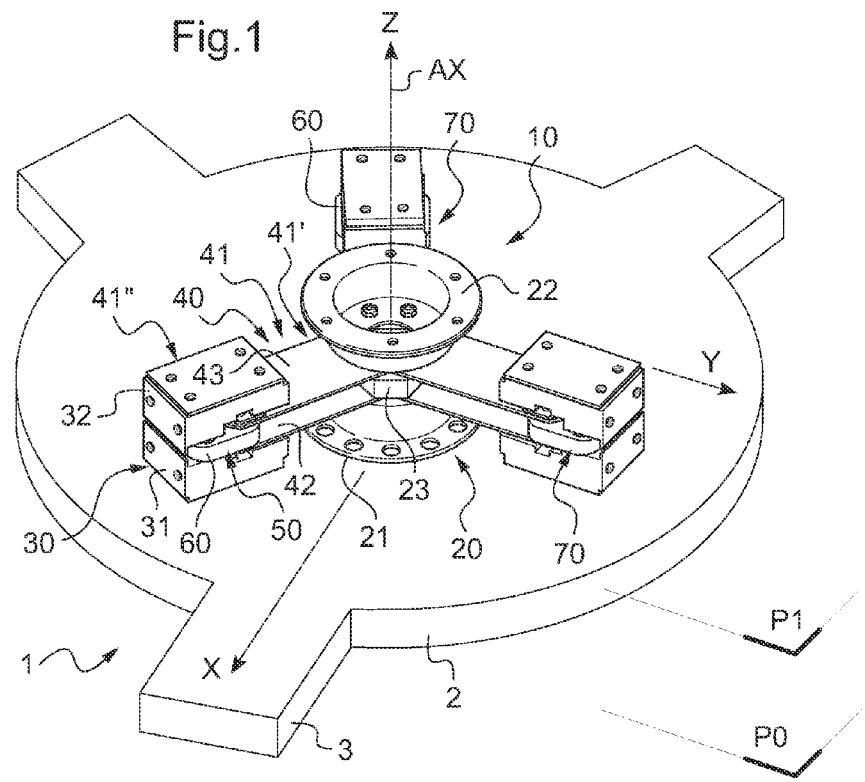
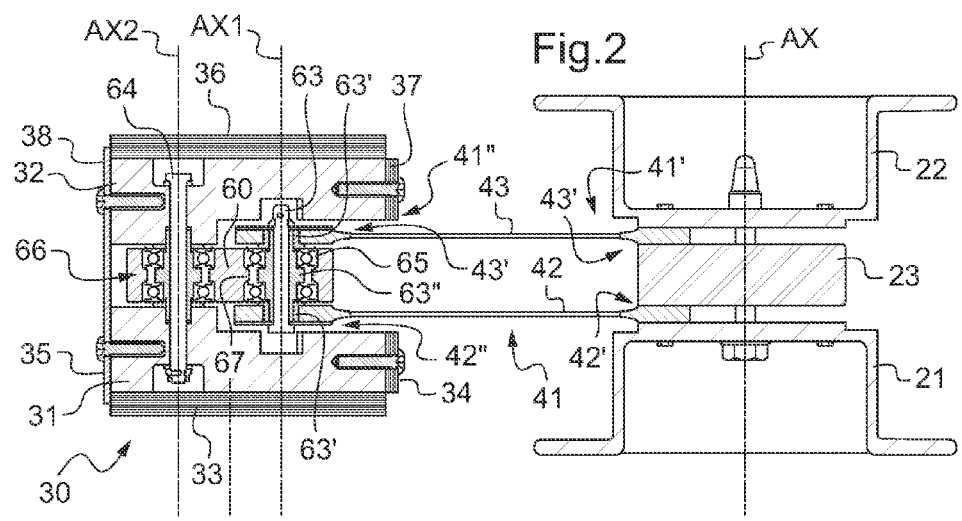

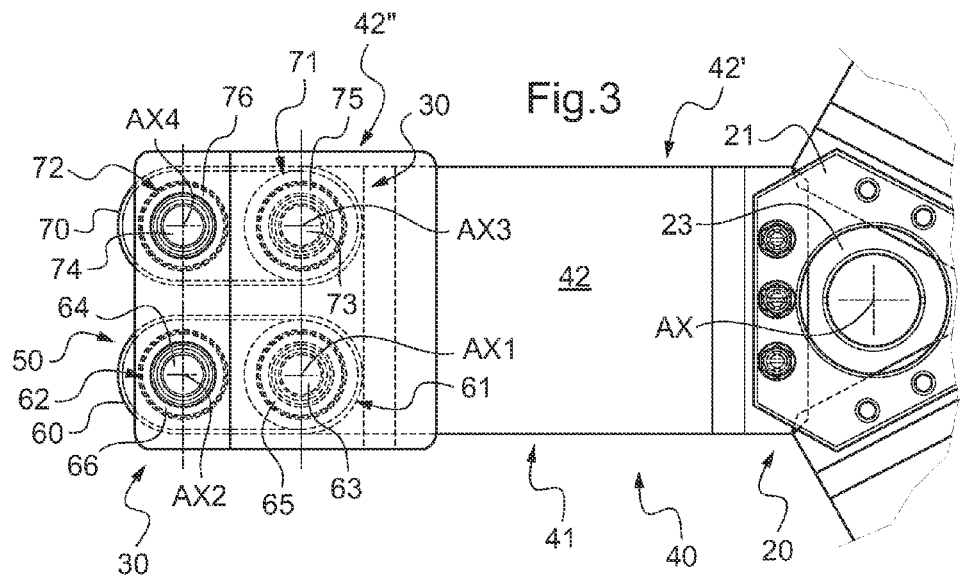
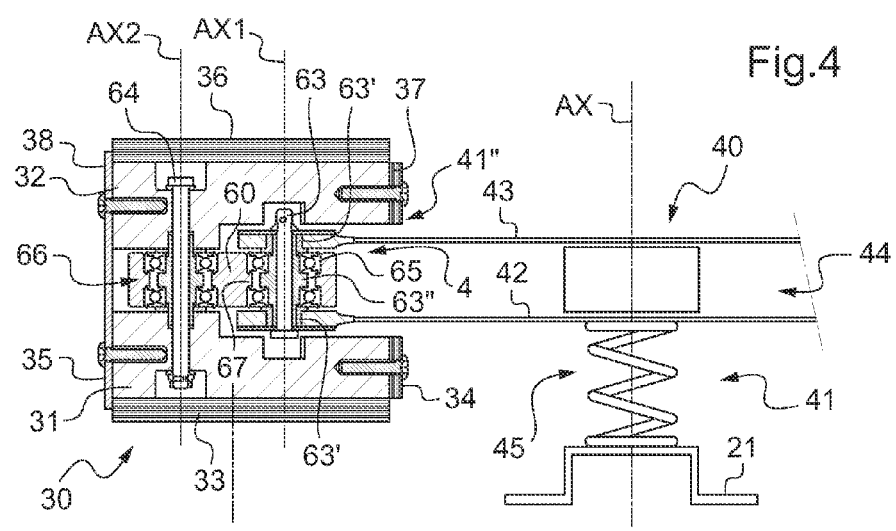

DEVICE FOR REDUCING THE VIBRATION GENERATED BY A ROTORCRAFT LIFT ROTOR, AND A ROTOR HUB PROVIDED WITH SUCH A DEVICE

CROSS REFERENCE TO RELATED APPLICATIONS

This application claims the benefit of FR 10 01852 filed on Apr. 30, 2010, the disclosure of which is incorporated in its entirety by reference herein.

BACKGROUND OF THE INVENTION (1) Field of the Invention

The present invention relates to a device for reducing the vibration generated by a rotorcraft lift rotor, and also to a rotor hub provided with such a device.

(2) Description of Related Art

The operation of a rotorcraft lift rotor, e.g. a helicopter main lift and propulsion rotor, generates parasitic forces at the head of the lift rotor. These parasitic forces then give rise to vibration that propagates to the airframe of the rotorcraft, such vibration being particularly perceptible in the cockpit of the rotorcraft.

In order to mitigate that drawback, devices are provided for attenuating the vibration that is generated, which devices are sometimes referred to as rotor head resonators.

In a first type of device, a moving mass is used together with return means suitable for repositioning the moving mass in a predetermined position.

According to document FR 2 416 838, a device is mounted on the top portion of the hub, which device comprises a moving mass that is held radially by resilient means inside a housing that is secured to the hub.

Furthermore, that mass is fastened to the top end of a rod. The rod is disposed substantially along the axis of rotation of the rotor in a recess in the rotor mast of the rotor. The bottom end of the rod is then hinged to a point that is situated on the axis of rotation of the rotor.

Thus, the resilient means tend to keep the moving mass in a rest position, the moving mass being free to move in a plane substantially parallel to the top portion of the hub of the lift rotor, i.e. in a plane that is substantially perpendicular to the vertical axis of rotation of the rotor. The moving mass then directly opposes the vibration generated by the rotor.

The forces that induce the vibration that needs to be reduced and that is generated at the rotor head can be described by using a force torsor, sometimes known to the person skilled in the art as the "rotor head torsor". The "rotor head torsor" is then made up in particular both of three resultant forces along three mutually perpendicular axes, and of three moments about those axes, namely:

two axes referred to below and for convenience as the "first and second resultant axes" defining a plane referred to below as the "first resultant plane" that is parallel to the top portion of the rotor hub and that is thus substantially perpendicular to the vertical axis of rotation of the rotor; and an axis that is referred to as the "third resultant axis" and that is perpendicular to said first resultant plane.

The device shown in document FR 2 416 838 is then effective in filtering the resultant forces of the "rotor head torsor" along the first and second resultant axes that are substantially parallel to the plane containing said moving mass, however it has practically no effect on the resultant force of the "rotor head torsor" along the third resultant axis that is substantially perpendicular to the axis of rotation of the lift rotor and perpendicular to the plane containing the moving mass.

Furthermore, since the moving mass used is constant, the first device is particularly effective when the excitation frequency of the vibration that is to be reduced is close to the resonant frequency of said moving mass, which resonant frequency is constant. The first device with its concentrated mass is then not very well adapted to excitation frequencies that vary.

Document FR 2 749 901 describes a device having a main moving mass that is held radially inside a housing. It is also provided with an adjustment moving mass suitable for sliding on the rod that is fastened to the main moving mass and that is hinged to a point situated on the axis of rotation of the rotor.

By moving the adjustment moving mass, it then becomes possible to adapt the device so as to enable it to reduce vibration at frequencies that vary. Nevertheless, the absence of filtering of the resultant forces of the "rotor head torsor" along all three mutually perpendicular axes remains, and in particular the absence of filtering along the third resultant axis that is substantially parallel to the axis of rotation of the lift and possibly also propulsion rotor.

Document FR 2 575 800 describes a vibration damper for a helicopter rotor hub, which damper is provided with a central moving mass suspended inside an outer casing along three directions by mechanical and pneumatic springs.

Thus, the same mass is used to combat all three resultant forces of the "rotor head torsor".

Although effective, it is found that the stresses along the third resultant axis differ from the stresses along the first and second resultant axes. Developing such a device can therefore be difficult. Furthermore, reducing vibration at varying frequencies can be complex.

In the same manner, document EP 0 790 180 provides for suspending a central moving mass from a plurality of springs, the central moving mass also being arranged on a movement limiter that extends along a vertical axis.

Finally, document U.S. Pat. No. 6,443,273 discloses the possibility of suspending a central mass in a casing by using springs.

It should also be observed that document EP 1 007 406 describes a spring-mass type device.

Devices of the first type appear to be difficult to adapt to counter forces along all three resultants of the "rotor head torsor" when generated by vibration at varying frequencies.

In a second type of device, weight elements are distributed around the axis of rotation of the rotor.

Document WO 2005/079200 describes a first variant of the second type that is provided with two coaxial weight elements together with control means, the control means being suitable for controlling the speed of rotation of said weight elements and their relative angular position.

In a second variant of this second solution, pendulums are used that oscillate under the effect of centrifugal force. Each pendulum has a weight element connected to a hinge of a support, the support performing rotary motion about the axis of rotation of the main rotor. For example, the support is provided with a plurality of radial arms forming a star, each radial arm having a hinge connected to a weight element.

Under such circumstances, and unlike devices of the first type, there is no need to implement dedicated return means, centrifugal force providing the required return force.

That feature gives pendulum devices a capacity to adapt automatically to variations in the frequency of the vibration for attenuating.

A change in the speed of rotation of the rotor gives rise not only to a change in the frequency of the vibration for attenuating, but also gives rise to a change in the centrifugal force exerted on the pendulum. Thus, those devices of the second type are said to be "self-adaptable" or "self-adjustable".

The pendulums can oscillate in a first plane perpendicular to the axis of rotation of the main rotor, or in a second plane having said axis of rotation of the main rotor lying therein, as a function of the nature of the vibration to be attenuated.

In a first embodiment of a pendulum device, referred to as a "simple pendulum resonator" for convenience, the weight element performs circular motion about a single axis of rotation.

Documents FR 2 733 483 and FR 2 435 391 describe such simple pendulum resonators.

In a second embodiment referred to as a "bifilar pendulum resonator" by the person skilled in the art, each weight element moves in circular translation. The term "circular translation" is used of a body that is moving in a plane, with two distinct points of said body describing two circular paths having the same radius but different centers.

Compared with a simple pendulum resonator, the bifilar pendulum resonator is capable of filtering higher frequencies.

Document FR 2 018 491 describes such a second embodiment.

Each bifilar weight element comprises a U-shaped member having a branch of a star-shaped support engaged therein. The U-shaped member is provided with two first openings of circular section that co-operate with two second openings of circular section in a support via two rollers.

Document FR 2 768 995 describes a third embodiment of a device of the second type referred to as an "accelerated pendulum resonator", for convenience. According to that document, the weight element is a counterweight connected by a connection arm to a support branch, the support not being secured to the hub of the rotor, but rather to a drive member that rotates at a speed of rotation that is faster than the speed of rotation of the rotor.

Independently of the embodiment, devices that implement pendulums do not appear to be sufficient to counter all of the forces that result from the "rotor head torsor" along three mutually perpendicular axes, and more particularly the resultant force along the third resultant axis that is substantially parallel to the axis of rotation of the lift rotor.

SUMMARY OF THE INVENTION

Under such circumstances, an object of the present invention is to propose a device for reducing the vibration generated by a rotorcraft lift rotor and that is effective in countering the forces that result from the "rotor head torsor" along all three of its mutually perpendicular axes, while also being capable of adapting to varying frequencies.

The invention provides a device for reducing the vibration of a rotorcraft main rotor that is provided with a hub and a plurality of blades, the device having a support together with at least one weight element, which device is remarkable in that the weight element is fastened to the support by connection means, and the weight element is connected to the connection means by guide means for guiding the weight element in movement in circular translation in a filter plane that is movable perpendicularly to an elevation axis of the device, the connection means including resilient return means serving to allow the filter plane to move in elevation while keeping the filter plane perpendicular to the elevation axis under the effect of the vibration.

Under such circumstances, the device may include a plurality of weight elements distributed radially around the elevation axis, each weight element being hinged to the connection means by guide means. It can be understood that when the weight element is said to move in a filter plane, that means that the center of gravity of the weight element moves in said filter plane.

Thus, when the device is arranged on the hub of a rotorcraft rotor, each weight element, while moving in the fastener plane, filters the resultant forces of the "rotor head torsor" along the first and second resultant axes.

Furthermore, while moving in the fastener plane, each weight element also filters the resultant forces of the "rotor head torsor" along the third resultant axis. It should be observed that this movement in elevation of the weight element is performed while keeping the filter plane perpendicular to the elevation axis. Consequently, it is possible to decouple filtering of the forces in the first resultant plane completely from the forces along the third resultant axis.

Thus, decoupling is not obtained by using a weight element provided with two members that move independently of each other in distinct directions, since the invention uses a weight element in which all of its members move together.

This device is then relatively easy to adjust, and the device of the invention thus solves the problem posed.

The invention may include one or more of the following additional characteristics.

Thus, the resilient means extend from a first end zone towards a second end zone, and the first end zone is fastened to the support and the second end zone is fastened to the guide means.

Furthermore, the guide means may comprise a first link and a second link.

The first link may be fastened to the connection means by a first primary connection member allowing the first link to move in rotation about a first primary axis of rotation, the first link being fastened to the weight element by a first secondary connection member allowing the first link to move in rotation about a first secondary axis of rotation, the second link being fastened to the connection means by a second primary connection member allowing the second link to move in rotation about a second primary axis of rotation, the second link being fastened to the weight element by a second secondary connection member allowing the second link to move in rotation about a second secondary axis of rotation, the first and second primary axes of rotation and the first and second secondary axes of rotation being mutually parallel.

The guide means thus make use of two links, unlike the devices described in the prior art that use a U-shaped member or its equivalent together with two rollers. The guide means thus guarantee that the weight element is positioned in the filter plane. Furthermore, the guide means are not subjected to any risk of seizing, thereby facilitating maintenance of the device.

For example, at least one primary connection member includes a primary fastener pin co-operating with a primary rotary member.

Furthermore, the first and second primary axes and the first and second secondary axes may be mutually parallel, and the first distance between the first primary axis and the first secondary axis may be equal to the second distance between the second primary axis and the second secondary axis.

Thus, the first primary connection member may comprise a first primary fastener pin cooperating with a first primary rotary member, at least one ball or roller bearing for example. Similarly, the second primary connection member may comprise a second primary fastener pin co-operating with a second primary rotary member, at least one ball or roller bearing for example.

Furthermore, each primary fastener pin may equally well either be fastened to the associated link and connected to the resilient means by at least one primary rotary member, or else it may be fastened to the resilient means and connected to the associated link by at least one primary rotary member.

Furthermore, at least one secondary connection member comprises a secondary fastener pin co-operating with a secondary rotary member.

Thus, the first secondary connection member may have a first secondary fastener pin co-operating with a first secondary rotary member, at least one ball or roller bearing for example. Likewise, the second secondary connection member may include a second secondary fastener pin co-operating with a second secondary rotary member at least one ball or roller bearing for example.

Furthermore, each secondary pin may equally well either be fastened to the associated link and connected to a weight element by means of at least one secondary rotary member, or else it may be fastened to the weight element and connected to the associated link by means of at least one secondary rotary member.

Furthermore, the weight element may comprise a bottom mass and a top mass that are disposed on either side of the guide means, the bottom mass and the top mass each being capable of receiving adjustment masses.

The bottom mass and the top mass of a weight element are secured to each other so that they move together, either by being component portions of a one-piece weight element of the U-shaped type, for example, or else by being connected together by the first and second secondary connection members, for example.

This characteristic makes it possible to give the device an optimized capacity for adjustment.

In order to reduce or even eliminate forces along the elevation axis, i.e. along the third resultant axis for an application to a rotor, it suffices to increase or reduce the weights of the bottom and top masses by the same amount. Under such circumstances, there is no change to the center of gravity of the weight element or to its movement in the filter plane.

In order to reduce or even eliminate forces in the filter plane, i.e. in the first resultant plane for an application to a rotor, it suffices to move the center of gravity of the bottom and top masses without changing their weight. Under such circumstances, the position of the center of gravity of the weight element is modified, while being kept in a given plane to avoid influencing filtering of forces along the elevation axis.

In a preferred first embodiment, the resilient means may comprise two flexible blades, the guide means being located between the flexible blades. The weight element then performs circular translation in elevation.

In a second embodiment, the resilient means comprise fastener means and a resilient member, a spring or a block of resilient material forming part of the elastomer group, for example. The resilient member is fastened to the support and to the fastener means, extending in elevation along the elevation axis, with the guide means being fastened to the fastener means.

Finally, in addition to a device for reducing the vibration of a main rotor, the invention also provides a rotor provided with a hub that includes such a device of the invention.

BRIEF DESCRIPTION OF THE DRAWINGS

The invention and its advantages appear in greater detail from the following description of embodiments given by way of illustration with reference to the accompanying figures, in which:

FIG. 1 is a three-dimensional view of a rotor of the invention;

FIG. 2 is a section of a device in a first embodiment;

FIG. 3 is a view from beneath of a device in a first embodiment; and

FIG. 4 is a diagrammatic section of a device in a second embodiment.

Elements that are present in more than one of the figures are given the same references in each of them.

DETAILED DESCRIPTION OF THE PREFERRED EMBODIMENTS

FIG. 1 shows a rotor 1 provided with a hub 2, the hub 2 having, by way of example, a plurality of arms for fastening blades that are not shown, for convenience.

The rotor 1 includes a device 10 for filtering the forces that result from the "rotor head torsor" along the first and second resultant axes X, Y contained in the first resultant plane P0 of the hub, and along the third resultant axis Z coinciding with the axis of rotation AX of the rotor 1. By way of example, the rotor 1 forms part of a rotary wing of a rotorcraft, such as the main rotor for providing a helicopter with lift and propulsion.

The device 10 is fitted with a support 20 fastened to the hub 2 by conventional means.

The support 20 then supports a plurality of weight elements 30, each weight element 30 being fastened to the support 20 via connection means 40 co-operating with guide means 50. More precisely, each weight element 30 is hinged to corresponding guide means 50, the guide means 50 being hinged to corresponding connection means 40 fastened to the support 20.

It should be observed that the support 20 has at least one bottom support member 21 fastened to the hub 2. Furthermore, the support 20 may include a top support member 22 suitable for carrying an external fairing to minimize the aerodynamic effects of the device, the fairing not being shown in order to avoid overloading FIG. 1.

Furthermore, the guide means 50 comprise means for guiding the corresponding weight element to move in circular translation in a filter plane P1 parallel to the first resultant plane P0. Under such circumstances, the filter plane P1 is perpendicular to an elevation axis AX of the device coinciding with the axis of rotation of the rotor. Below, the reference "AX" designates said axis of rotation and said elevation axis.

When the hub is driven in rotation, each weight element 30 oscillates on either side of a rest position in the filter plane P1, while moving in circular translation under guidance of the guide means 50. This results in the dynamic components of the forces of the "rotor head torsor" being filtered in the first resultant plane.

Consequently, the guide means 50 may be provided with first and second links 60 and 70, possibly identical links 60, 70, each of them being fastened both to the weight element and to the connection means 40.

With reference to FIGS. 2 and 3, the guide means comprise a first primary connection member 61 connecting the first link 60 to the connection means 40, the first primary connection member 61 allowing the first link to move in rotation relative to the connection means 40 about a first primary axis of rotation AX1. For example, the first primary connection member 61 has a first primary fastener pin 63 fastened to the connection means 40 and co-operating with a first primary rotary member 65 secured to the first link, such as a bolt co-operating with at least one ball or roller bearing. The first primary fastener pin 63 then passes through the first primary rotary member 65.

FIG. 2 shows an embodiment implementing a bolt 63 that is fastened to the connection means, the bolt 63 co-operating with two ball bearings via two bearing washers 63' and a bushing 63" provided with a shoulder. Each ball bearing is then held between one of the bearing washers and said shoulder and also against a positioning ring 67 of the first link.

Furthermore, the guide means comprise a first secondary connection member 62 connecting the first link 60 to the weight element 30, this first secondary connection member 62 allowing the first link to move in rotation relative to the weight element 30 about a first secondary axis of rotation AX2. For example, the first secondary connection member 62 comprises a first secondary fastener pin 64 fastened to the weight element 30 that co-operates with a first secondary rotary member 66 secured to the first link, such as a bolt co-operating with at least one ball or roller bearing. The first secondary fastener pin 64 then passes through the first secondary rotary member 66.

Similarly, the guide means comprise a second primary connection member 71 connecting the second link 70 to the connection means 40, the second primary connection member 71 allowing the second link to move in rotation relative to the connection means 40 about a second primary axis of rotation AX3. For example, the second primary connection member 71 comprises a first primary fastener pin 73 fastened to the connection means 40 that co-operate with a second primary rotary member 75 secured to the second link, such as a bolt co-operating with at least one ball or roller bearing. The second primary fastener pin 73 then passes through the second primary rotary member 75.

Furthermore, the guide means comprise a second secondary connection member 72 connecting the second link 70 to the weight element 30, the second secondary connection member 72 allowing the second link to move in rotation relative to the weight element 30 about a second secondary axis of rotation AX4. For example, the second secondary connection member 72 comprises a second secondary fastener pin 74 fastened to the weight element 30 that co-operates with a second secondary rotary member 76 secured to the second link, such as a bolt co-operating with at least one ball or roller bearing. The second secondary fastener pin 74 then passes through the second secondary rotary member 76.

The first and second primary axes AX1 and AX2, and the first and second secondary axes AX3 and AX4 are mutually parallel. Furthermore, the first distance between the first primary axis AX1 and the first secondary axis AX3 is equal to the second distance between the second primary axis AX2 and the second secondary axis AX4.

It should be observed that the invention makes it possible to avoid the weight element moving along the elevation axis independently of the connection means, unlike devices using U-shaped member(s) and rollers, for example.

Furthermore, the connection means 40 of a given weight element are provided with resilient return means 41 serving to allow the given weight element to move in elevation while keeping the filter plane P1 perpendicular to the elevation axis AX. When the hub is driven in rotation, each weight element 30 oscillates in an elevation direction towards and away from the hub 2 without modifying the angle between the filter plane and the elevation axis. This results in filtering the forces of the "rotor head torsor" along the third resultant axis, which filtering is decoupled from the filtering of forces along the first and second resultant axes.

In a first embodiment shown in FIGS. 1 to 3, the resilient means extend from a first end zone 41' towards a second end zone 41", the first end zone 41' being fastened to the support 20 and the second end zone 41" being fastened to the guide means 50.

More precisely, and with reference to FIG. 2, the resilient means comprise first and second flexible blades 42 and 43, each extending in a plane perpendicular to the elevation axis.

The support 20 then includes a spacer 23 interposed between the first end zone 42' and 43' of the first and second flexible blades 42 and 43, respectively. Thus, the first end zone 42' of the first flexible blade 42 is located between the bottom support member 21 and the spacer 23, while the first end zone 43' of the second flexible blade 43 is located between the top support member 22 and the spacer 23.

The first link 60 and the second link 70 are consequently arranged between the second end zones 42" and 43" respectively of the first and second flexible blades.

Such resilient means cause the weight element 30 to move in elevation with motion in circular translation. Under such circumstances, the filter plane in which the weight element 30 moves remains continuously perpendicular to the elevation axis AX.

With reference to FIG. 4, in a second embodiment, the connection means 40 may comprise fastener means 44 and a resilient member 45 of the spring or elastomer block type, for example.

The resilient member 45 is thus arranged on the elevation axis AX by being fastened to the support 20. The fastener means 44 are then fastened to the resilient member 45 and to the guide means 50.

By way of example, the fastener means 44 comprise one plate or two plates separated by a spacer, as can be seen in the variant shown diagrammatically in FIG. 4.

Independently of the embodiment, the weight element may comprise a bottom mass 31 and a top mass 32 disposed on either side of the guide means. These bottom and top masses 31 and 32 may be secured to each other or they may form portions of a one-piece mass, e.g. presenting a U-shape.

Furthermore, the weight element may be provided with adjustment masses such as bottom adjustment masses 33 secured to the bottom mass 31, first front adjustment masses 34 secured to the bottom mass 31 facing the support 20, first rear adjustment masses 35 secured to the bottom mass 31 and remote from the support 20, top adjustment masses 36 secured to the top mass 32, second front adjustment masses 37 secured to the top mass 32 facing the support 20, and second rear adjustment masses 38 secured to the top mass 32 and remote from the support 20.

In order to adjust the device to filter forces along the first and second resultant axes, the position of the center of the gravity of the weight element is adjusted, without changing its mass. For example, a front adjustment mass is shifted rearwards in order to transform it into a rear adjustment mass.

Conversely, in order to adjust the device in order to filter forces along the third resultant axis, the mass of the weight element is modified without modifying the position of the center of gravity of the weight element. For example, the weights of the bottom and top adjustment masses 33 and 36 are increased or decreased by the same amount.

Naturally, the present invention may be subjected to numerous variants as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, it will be understood that it is possible to use a weight element that comprises solely the top mass or solely the bottom mass.

What is claimed is:

1. A device for reducing the vibration of a rotorcraft main rotor provided with a hub and a plurality of blades, said device having a support together with at least one weight element, wherein said weight element is fastened to said support by connection means, and said weight element is connected to said connection means by guide means for guiding said weight element in movement in circular translation in a filter plane that is movable perpendicularly to an elevation axis of said device, said connection means including resilient return means serving to allow said filter plane to move in elevation while keeping the filter plane perpendicular to said elevation axis under the effect of said vibration;
   wherein said guide means comprise a first link and a second link;
   wherein said first link is fastened to said connection means by a first primary connection member allowing said first link to move in rotation about a first primary axis of rotation, said first link being fastened to said weight element by a first secondary connection member allowing said first link to move in rotation about a first secondary axis of rotation, said second link being fastened to said connection means by a second primary connection member allowing said second link to move in rotation about a second primary axis of rotation, said second link being fastened to said weight element by a second secondary connection member allowing said second link to move in rotation about a second secondary axis of rotation, said first and second primary axes of rotation and said first and second secondary axes of rotation being mutually parallel; and
   wherein at least one primary connection member includes a primary fastener pin co-operating with a primary rotary member.

2. A device according to claim 1, wherein said resilient means extend from a first end zone towards a second end zone, and said first end zone is fastened to said support and said second end zone is fastened to said guide means.

3. A device according to claim 1, wherein the first and second primary axes and the first and second secondary axes are mutually parallel, and the first distance between the first primary axis and the first secondary axis is equal to the second distance between the second primary axis and the second secondary axis.

4. A device according to claim 1, wherein at least one secondary connection member comprises a secondary fastener pin co-operating with a secondary rotary member.

5. A device according to claim 1, wherein said weight element comprises a bottom mass and a top mass that are disposed on either side of said guide means, the bottom mass and the top mass each being capable of receiving adjustment masses.

6. A device according to claim 1, wherein said resilient means comprise two flexible blades, said guide means being located between said flexible blades.

7. A device according to claim 1, wherein said resilient means comprise fastener means and a resilient member, said resilient member being fastened to said support and to said fastener means, extending in elevation along said elevation axis, said guide means being fastened to said fastener means.

8. A rotor provided with a hub, wherein the rotor includes a device according to claim 1.

9. A device for reducing the vibration of a rotorcraft main rotor provided with a hub and a plurality of blades, said device having a support together with at least one weight element, wherein said weight element is fastened to said support by connection means, and said weight element is connected to said connection means by guide means for guiding said weight element in movement in circular translation in a filter plane that is movable perpendicularly to an elevation axis of said device, said connection means including resilient return means serving to allow said filter plane to move in elevation while keeping the filter plane perpendicular to said elevation axis under the effect of said vibration;
   wherein said guide means comprise a first link and a second link; and
   wherein said first link is fastened to said connection means by a first primary connection member allowing said first link to move in rotation about a first primary axis of rotation, said first link being fastened to said weight element by a first secondary connection member allowing said first link to move in rotation about a first secondary axis of rotation, said second link being fastened to said connection means by a second primary connection member allowing said second link to move in rotation about a second primary axis of rotation, said second link being fastened to said weight element by a second secondary connection member allowing said second link to move in rotation about a second secondary axis of rotation, said first and second primary axes of rotation and said first and second secondary axes of rotation being mutually parallel.

10. A device according to claim 9, wherein said resilient means extend from a first end zone towards a second end zone, and said first end zone is fastened to said support and said second end zone is fastened to said guide means.

11. A device according to claim 9, wherein at least one primary connection member includes a primary fastener pin co-operating with a primary rotary member.

12. A device according to claim 9, wherein the first and second primary axes and the first and second secondary axes are mutually parallel, and the first distance between the first primary axis and the first secondary axis is equal to the second distance between the second primary axis and the second secondary axis.

13. A device according to claim 9, wherein at least one secondary connection member comprises a secondary fastener pin co-operating with a secondary rotary member.

14. A device according to claim 9, wherein said weight element comprises a bottom mass and a top mass that are disposed on either side of said guide means, the bottom mass and the top mass each being capable of receiving adjustment masses.

15. A device according to claim 9, wherein said resilient means comprise two flexible blades, said guide means being located between said flexible blades.

16. A device according to claim 9, wherein said resilient means comprise fastener means and a resilient member, said resilient member being fastened to said support and to said fastener means, extending in elevation along said elevation axis, said guide means being fastened to said fastener means.

17. A device for reducing vibration of a rotorcraft main rotor provided with a hub and a plurality of blades, said device comprising:
   a support;
   connection means fastened to the support and comprising resilient return means;

guide means connected to the connection means and comprising a first link and a second link; and at least one weight element fastened to the guide means, wherein the guide means are configured to guide the weight element in movement in circular translation in a filter plane that is movable perpendicularly to an elevation axis of the device;

wherein the resilient return means are configured to allow the filter plane to move in elevation while maintaining the filter plane perpendicular to the elevation axis under the effect of vibration;

wherein the first link is fastened to the connection means by a first primary connection member allowing the first link to move in rotation about a first primary axis of rotation;

wherein the first link is fastened to the weight element by a first secondary connection member allowing the first link to move in rotation about a first secondary axis of rotation;

wherein the second link is fastened to the connection means by a second primary connection member allowing the second link to move in rotation about a second primary axis of rotation;

wherein the second link is fastened to the weight element by a second secondary connection member allowing the second link to move in rotation about a second secondary axis of rotation; and wherein the first and second primary axes of rotation and the first and second secondary axes of rotation are mutually parallel.

\* \* \* \* \*